July 5, 1938.  S. J. NORDSTROM  2,122,914
PLUG VALVE
Filed May 27, 1935

INVENTOR.
Sven J. Nordstrom.
BY
Lewis D. Konigsford
ATTORNEY.

Patented July 5, 1938

2,122,914

UNITED STATES PATENT OFFICE 2,122,914

PLUG VALVE

Sven J. Nordstrom, Piedmont, Calif., assignor to Merco Nordstrom Valve Company, Pittsburgh, Pa., a corporation of Delaware Application May 27, 1935, Serial No. 23,537

4 Claims. (Cl. 251—93)

Tapered plug valves are used extensively for the control of water, compressed air, illuminating gas and the like because they are less expensive than other types of valves, but lubricated plug valves have found only a limited application in these fields because of their higher cost. The commercial requirements of these industries impose limitations upon the cost of valves, and therefore pressure lubricated plug valves while generally recognized as greatly superior to non-lubricated plug valves, have not been extensively used in those installations where cost is an important consideration.

It is an object of my invention to provide a pressure lubricated plug valve structure which will be relatively inexpensive to manufacture and will therefore be commercially applicable to a wide field of use.

It is a further object of my invention to provide a plug valve structure in which lubricant under pressure may be used for jacking, sealing, and lubricating the valve and in which provision is made for continuously maintaining a substantially constant resilient seating force on the plug without the necessity of frequent readjustment of the valve or replacement of parts thereof.

It is a further object to provide a lubricated or nonlubricated valve in which a fibrous packing material is utilized to prevent leakage of lubricant or of line fluid to the exterior of the valve, and in which a spring is provided to take up any shrinkage or permanent set of the packing so as to maintain the plug seated at a substantially constant pressure.

It is a further object to provide a valve in which a lubricant chamber is provided adjacent the smaller end of the plug to jack the plug from its seat, and in which the packing employed to prevent leakage from said chamber is additionally compressed upon jacking of the plug from its seat, thereby providing additional resistance to the escape of lubricant or line fluid between the packing and the plug.

A further object is the provision of an inexpensive lubricant lift type of plug valve whereby the packing utilized to resiliently maintain the plug seated is constantly sealed and lubricated.

A further object of the invention is to provide means whereby the resilient holding force upon the plug will be greater when the plug is in closed position than when it is in open position.

These and other objects of the invention will be apparent from a consideration of the following specification taken in connection with the annexed drawing in which.

Figure 2:
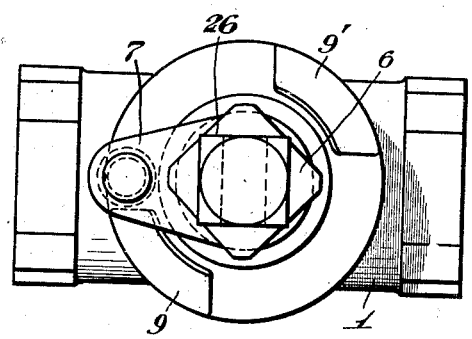
Figure 2 is a plan view of the modification shown in Figure 1.

Referring to the drawing, the numeral 1 designates generally the casing or body of my improved valve having a passageway 2 therethrough for flow of fluid, and a tapered bore 3 forming a valve seat extending transversely thereof. A tapered plug 4 is seated in the valve seat 3 and has a port 5 extending therethrough adapted to register with the passageway 2 in the open position of the valve. The plug has an extension 6 projecting from the casing and which is noncircular at its end to receive a wrench (not shown) for operating the valve. A lateral extension 7 is formed preferably integral with the extension 6, and a depending stop member 8 is secured thereto by riveting, or in any other suitable manner, and cooperates with the lugs 9 and 9' formed on the body to limit angular rotation of the plug to 90° for full open and full closed positions.

The lower portion of the body is formed with an extension 10 having a bottom wall which is bored as indicated at 11, and a cylindrical extension 12 on the plug 4, preferably formed integral therewith, extends with a loose fit through the hole 11. The extension 10 is counterbored at 13 and provides a shoulder 13' at the bottom of the counterbore on which are seated a plurality of fibrous packing washers 14, shown as three in number, but which may be any desired number, located in the counterbore 13. The washers 14 may be made of asbestos composition, leather, or any other suitable fibrous material. An anti-friction washer 15 made of phosphor-bronze or any other suitable material is located on top of the packing washers 14, and a rigid washer 16 is superposed upon the anti-friction washer 15. The end of cylindrical extension 12 of the plug is threaded as indicated at 17 and receives a castellated nut 18 which is held in place by a pin or key 19 passing through one of the slots 20 in the nut 18. A spring 21 is interposed between the nut 18 and the rigid washer 16. Preferably, this spring is in the form of a split steel lock washer and forms a relatively stiff spring with sufficient amplitude of action to take up any shrinkage or compression of the gaskets 14 without materially altering the seating pressure of the plug on its seat.

From the description so far pursued, it will be apparent that the tapered plug 4 is held in its seat by the combined resiliency of the spring 17 and fibrous packing washers 14, and the resilient seating pressure of the plug against its seat can be adjusted within desired limits by adjustment of the nut 18 to compress or expand the spring 21.

The extension 6 of the plug is counterbored and threaded as indicated at 25 to provide a lubricant reservoir, and receives lubricant compressing screw 26 therein. The lubricant reservoir 25 connects at its bottom with a lateral passage 27 formed in the plug, the passage 27 having a widened mouth 28 which receives a ball 29, and which is adapted to seat on the chamfered shoulder 30 formed between the bores 27 and 28. A circumferential groove 31 is formed in the plug at its top and connects with the mouth 28 of the lateral groove, and the casing may have a directly opposite circumferential groove 32 formed in the seat which overlaps the groove 31 to enable uniform lapping of the plug in its seat. A lubricant chamber 35 is formed in the casing adjacent the bottom of the plug, and diametrically opposite longitudinal grooves 33 and 34 are formed in the surface of the plug and connect the circumferential groove 31 with the lubricant chamber 35. Lubricant under pressure from chamber 35 passes through the clearance between the bore 11 and extension 12 to seal the union of the packing washers 14 and shoulder 13'. As the packing washers 14 do not rotate relative to the shoulder 13' a permanent seal is thereby accomplished.

The operation of the valve now will be described. The valve is lubricated by inserting a stick of lubricant in the reservoir 25, and turning of the screw 26 into the bore 25 forces the lubricant before it through the lateral passage 27, past the ball check valve 29, into the circumferential grooves 31 and 32, and from thence the lubricant is conducted through the longitudinal grooves 33 and 34 to the lubricant chamber 35 at the bottom of the valve. The fibrous packing material 14, which preferably is in the form of washers, is compressed against the extension 12 of the valve and the retaining shoulder 13' by the resilient spring 21. With this construction sufficient lubricant pressure can be developed in the chamber 35 at the bottom of the plug to jack or lift the plug slightly from its seat, thereby providing a small space between the surface of the plug and the seat into which lubricant is extruded from the chamber 35, circumferential grooves 31 and 32, and the longitudinal grooves 33 and 34 to seal and lubricate the valve seating surfaces.

The spring 21 in connection with the fibrous packing washers 14 provides a resilient seating pressure on the plug which permits sufficient movement of the plug to effect this longitudinal jacking by lubricant pressure. The use of fibrous washers 14 avoids the necessity for accurately grinding and lapping the retaining shoulder 13' and the cylindrical surface of the extension 12, and the lubricant which passes through the clearance between the bore 11 and extension 12 seals the small irregularities between the packing 14 and shoulder 13', and also between the packing and plug extension 12. Were lubricant allowed to escape at these points it would interfere or even prevent the development of sufficient lubricant pressure in chamber 35 to jack the plug. Any tendency for the packing washers 14 to shrink due to repeated compression or aging of the material therein is taken up by the spring 21 which has a relatively greater amplitude so that the resilient seating force on the plug remains substantially constant over long periods of time. Also, any clearance formed by such shrinkage of the surface of packing 14 against shoulder 13' is automatically sealed by lubricant. As the packing does not rotate, the lubricant serves merely as a seal. Further, the jacking of the plug from its seat compresses the spring 21 and washers 14 and thereby urges the washers 14 more tightly against the shoulder 13' and cylindrical extension 12. The arrangement of longitudinal grooves 33 and 34 and of the stop lugs 9 and 9' is such that when the plug is turned clockwise as shown in Figure 2 for closing the valve, the grooves are not exposed to the line fluid in the passageway 2. It will be understood that any desired system of lubrication for lubricating and jacking the plug may be employed, as for example, that shown in my Patents 1,469,762 or 1,781,821.

Figure 3:
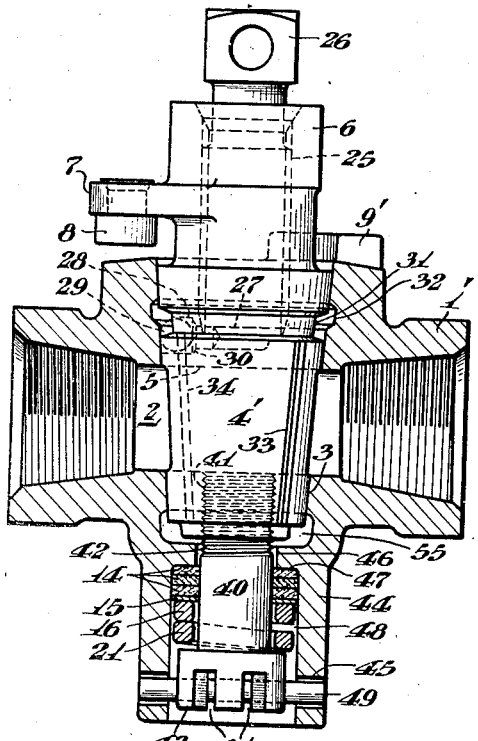
Figure 3 is a sectional view of a further modification.
Figure 4:
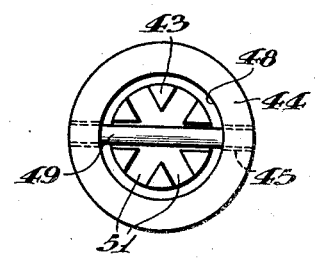
Figure 4 is a bottom elevation of a portion of Figure 3.

In the modification shown in Figures 3 and 4, the extension 40 is not formed integral with the plug 4'. In this modification the plug 4', which is similar in other respects to plug 4, has a threaded bore 41 in its smaller end which receives the threaded end 42 of a cylindrical extension 40 having a castellated head 43 integral therewith. In this modification there is an extension 44 on the valve casing 1', which casing is otherwise similar to valve casing 1, having a transverse bore 45 therethrough, and the extension 40 passes through a bore 46 formed in the casing, a shoulder 47 being formed between the bore 46 and a counterbore 48 through the extension. A plurality of packing washers 14 are received in the counterbore 48, and the antifriction washer 15 and rigid washer 16 are superposed thereon. A split locking washer 21 abuts rigid washer 16 and the castellated head 43, and it will be seen that in this construction the spring 21 and fibrous packing washers 14 resiliently maintain the plug on its seat. A key 49 passes through the bore 45 in the extension 44 and the slots 51 in the castellated head 43 to maintain the extension 40 in nonrotatable position with relation to the casing.

Figure 1:
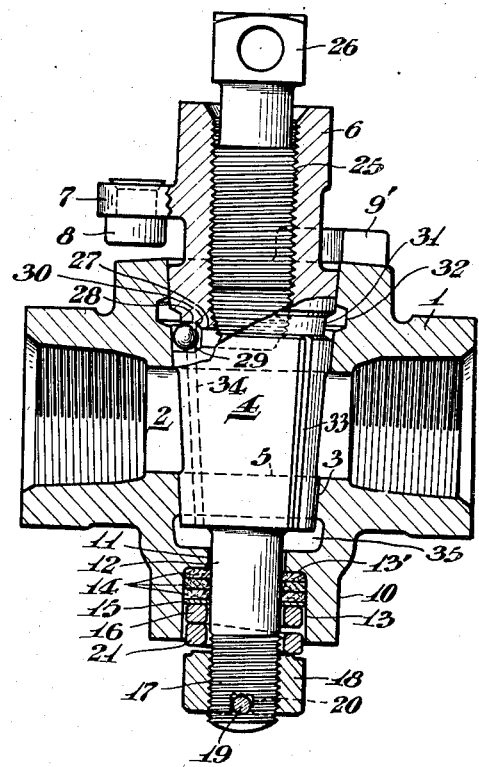
Figure 1 is a view partly in elevation of a preferred modification.

From the description so far pursued, it will be seen that when the valve plug 4' is rotated to closed position, the pitch of the threads on the extension 40 and in the bore 41 in the valve plug will tend to draw the tapered plug into its seat, thereby compressing the spring 21 and resilient washers 14 to insure a tight resilient seating of the plug in its seat. Upon turning the valve counterclockwise to open position the threaded engagement of extension 40 in the bore 41 will tend to raise the plug 4' or relieve the resilient seating pressure of the spring 21 and washer 14 on the plug thereby making the valve easier to turn. The plug is adapted to be jacked from its seat by lubricant pressure, and this jacking can be accomplished in the closed or open position of the plug or in any intermediate positions by lubricant supplied under pressure to the chamber 55 adjacent the bottom of plug 4'. The clearance between bore 46 and extension 40 allows lubricant to pass to and seal the space between shoulder 47 and the packing 14 in the same manner as previously described in connection with the modification shown in Figures 1 and 2. The system for introducing lubricant to this chamber is exactly like that shown in Figure 1 and the description thereof need not be repeated.

The invention may be embodied in other specific forms without departing from the spirit or essential characteristics thereof. The present embodiment therefore is to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a plug valve, the combination of a body, a tapered valve plug disposed therein, passageways in the body and plug for controlling the flow of fluid, a nonrotating extension at the smaller end of the plug forming a threaded connection therewith, packing surrounding the extension and seated against the body, a spring superposed upon the packing, and means on said extension cooperating with the spring to draw the plug toward its seat.

2. In a plug valve, the combination of a body, a tapered valve plug disposed therein, passageways in the body and plug for controlling the flow of fluid, packing seated against the body adjacent the smaller end of the plug, a spring superposed upon the packing, a nonrotating extension at the smaller end of the plug cooperating with the spring to draw the plug toward its seat, and means for moving the plug away from its seat by lubricant under pressure.

3. In a plug valve, the combination of a body, a tapered valve plug disposed therein, passageways in the body and plug for controlling the flow of fluid, there being a lubricant chamber formed adjacent the smaller end of the plug, an extension threaded to the plug at its smaller end and passing through said chamber, packing surrounding the extension and seated against the body to provide a seal, a friction washer superposed upon the packing, a rigid washer superposed upon the friction washer, a spring superposed upon the rigid washer, means for retaining said extension against rotation, means on said extension cooperating with the spring to draw the plug toward its seat, and means for supplying lubricant under pressure to said chamber for moving the plug away from its seat.

4. In a plug valve, the combination of a body with a tapered valve plug disposed therein, passageways in the body and plug for controlling the flow of fluid, an extension at the smaller end of the plug, said plug and extension being relatively axially movable to a limited extent upon rotation of the plug, packing surrounding the extension and seated against the body, a spring superposed upon the packing, means on the extension cooperating with the spring whereby said spring draws the plug towards its seat, means for supplying lubricant under pressure for moving the plug away from its seat, and means for retaining said extension against rotation relative to the casing.

SVEN J. NORDSTROM.